May 19, 1925.                                      1,538,401
R. M. HOLMES
FASTENER
Filed May 17, 1922
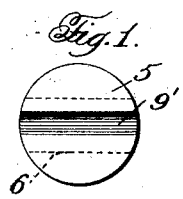 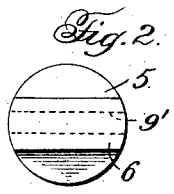 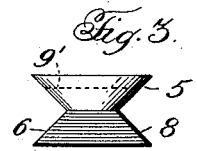 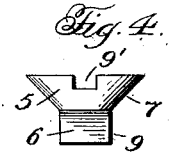
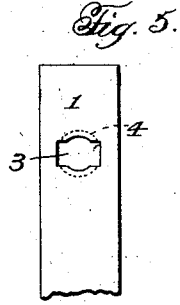 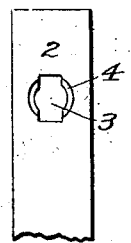 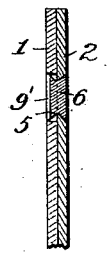 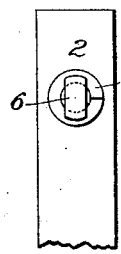 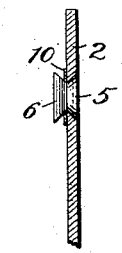
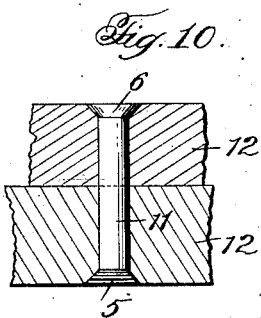 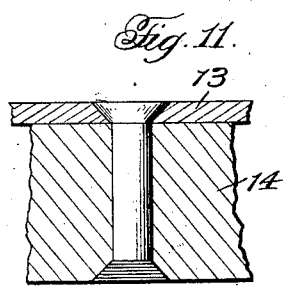
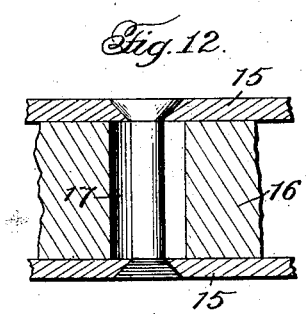
Witness:
Jas. E. S. Hutchinson
Inventor:
Richard M. Holmes,
By Bollinger & Block
   Attorneys Patented May 19, 1925.

1,538,401

UNITED STATES PATENT OFFICE.

RICHARD M. HOLMES, OF DAVENPORT, IOWA.

FASTENER.

Application filed May 17, 1922. Serial No. 561,731.

*To all whom it may concern:*

Be it known that I, RICHARD M. HOLMES, a citizen of the United States, residing at Davenport, in the county of Scott and State of Iowa, have invented certain new and useful Improvements in Fasteners, of which the following is a specification, reference being had therein to the accompanying drawing.

My invention relates to new and useful improvements in fasteners and more particularly to a fastener for connecting plates, the plates and fasteners being so formed that the outer faces of the fasteners will be flush with the faces of the plates and thereby leave no projections extending beyond the plates.

Another object resides in so forming the fastener that it may be easily inserted through openings in the plates and given a slight turn for securing in position or the operation reversed for disconnecting the plates when desired.

A further object consists of a fastener adapted for connecting two relatively thin plates, a thin and a thick plate, two relatively thick plates or two plates having a well or partition therebetween.

With the above and other objects in view which will appear as the description proceeds my invention consists in the novel details of construction and arrangement of parts described in the following specification and illustrated in the accompanying drawings, and while I have illustrated and described the preferred embodiments of the invention, as they now appear to me, it will be understood that such changes may be made as will fall within the scope of the appended claims.

In the drawings:—

Fig. 1 is a top plan of my improved fastener.

Fig. 2 is a bottom plan.

Fig. 3 is a side elevation.

Fig. 4 is an end elevation.

Fig. 5 is a bottom plan of one of the plates to be connected.

Fig. 6 is a top plan of the other plate to be connected.

Fig. 7 is a fragmental longitudinal vertical section through the connecting plates and fastener.

Fig. 8 is a plan of one of the plates connected thereto by means of a slit washer.

Fig. 9 is a fragmental longitudinal vertical section through the plate illustrated in Fig. 8 with the fastener shown in elevation and the washer shown in section.

Figs. 10, 11 and 12 show side elevations of a slightly modified form of the invention with portions of the plates being connected shown in fragmental longitudinal section.

Two plates adapted to be connected are shown at 1 and 2 and are provided with registering elongated openings 3, the outer faces of the plates being countersunk as at 4, at the sides of the openings 3, to receive the heads of fasteners to be described. The fastener comprises the round head 5 and the relatively narrow elongated head 6, the inner face of the round head 5 being inwardly beveled as shown at 7 and the ends of the head 6 being inwardly beveled as shown at 8. The sides of the head 6 are flat, as shown at 9, and said fasteners are preferably constructed as an integral member although, if desired, the heads might be separately formed and secured together at their meeting faces by soldering or in any other suitable manner. The head 5 is provided on its outer face with an elongated slot 9' for the reception of a screw-driver or other suitable instrument for turning.

To connect, the plates are placed together with the openings 3 registering to receive the fasteners and the countersunk portions of the plates facing outwardly. The elongated head 6 is passed through the openings 3 in the plates and the fastener is then given a quarter turn so that the head 6 will extend transversely of the elongated openings 3 and thereby prevent the removal of the fastener. With the fastener in position the heads 5 and 6 will be received in the countersunk portions of the plates so that the outer faces of the fastener will be flush with the faces of the plates. When it is desired to remove the fastener it is turned until the head 6 lies parallel with the elongated openings 3 and the head may then be withdrawn through the openings.

At times it may be desired to permanently connect the fastener to one of the plates and to accomplish this I provide the slit washer 10. When the washer is used the head 6 is passed through the opening 3 in one of the plates until the head 5 is received in the countersunk portion. The washer 10 is then placed around the shank of the fastener to engage the inner face of the plate as shown in Figs. 8 and 9 and prevent the removal of the fastener. With the fastener connected to one of the plates the other plate may be connected and disconnected at will by inserting or removing the head 6 through the opening 3 in said plate and rotating as previously described.

In Figs. 10, 11 and 12 I have shown the fastener as provided with a relatively long shank 11 adapted for connecting the heads 5 and 6 which are of the form or shape previously described. Fig. 10 shows the fastener as connecting two relatively thick plates 12; Fig. 11 shows the fastener as connecting a relatively thin plate 13 and a relatively thick plate 14; and Fig. 12 shows the fastener as connecting two relatively thin plates 15 spaced by a wall or partition 16 having an opening 17 through which the head and shank of the fastener may pass. In each form shown it will be understood that the plates are provided with the openings 3 and countersinks 4 of the shape previously described and that the fastener will be connected or disconnected in the same manner in all illustrations of the invention. While I have described my invention as primarily intended for connecting plates it will be understood that the fastener might be used in various connections where it is desired to connect two or more members adapted to have registering openings.

Having fully described my invention what I claim as new and desire to secure by Letters Patent is:

1. The combination with plates having registering elongated countersunk openings therethrough, of a rotatable fastener adapted to extend through said openings, the fastener having a relatively narrow head adapted to pass through the openings and having its ends inwardly beveled, and a relatively large inwardly beveled head adapted to engage the outer face of one plate, the heads when the fastener is rotated being received in the countersinks with their outer faces flush with the plates.

2. The combination with plates having elongated openings therein, the outer faces of the plates being countersunk adjacent said openings, the countersunk portions being circular in shape and without protrusions, of a fastener having two heads, one relatively narrower than the other, said narrower head being adapted to be passed through the elongated openings and the plates being drawn together and connected by a rotation of the fastener, the heads of the fastener being received in the countersunk portions of the plate and the fastener being held against accidental rotation by frictional engagement of its heads with the plates.

In testimony whereof I hereunto affix my signature in the presence of two witnesses.

RICHARD M. HOLMES.

Witnesses:
  EDWARD KUNKEL,
  HARRY N. PLACE.